(12) United States Patent
Bai (10) Patent No.: US 10,706,309 B2
(45) Date of Patent: *Jul. 7, 2020

(54) RECURSIVE NEURAL NETWORKS ON FUTURE EVENT PREDICTION

(71) Applicant: NEC Laboratories America, Inc., Princeton, NJ (US)

(72) Inventor: Bing Bai, Princeton Junction, NJ (US)

(73) Assignee: NEC Corporation, Tokyo (JP)

(*) Notice: Subject to any disclaimer, the term of this patent is extended or adjusted under 35 U.S.C. 154(b) by 610 days.

This patent is subject to a terminal disclaimer.

(21) Appl. No.: 15/420,476

(22) Filed: Jan. 31, 2017

(65) Prior Publication Data

US 2017/0249549 A1     Aug. 31, 2017

Related U.S. Application Data

(60) Provisional application No. 62/300,968, filed on Feb. 29, 2016.

(51) Int. Cl.
*G06K 9/18* (2006.01)
*G06N 3/04* (2006.01)
(Continued)

(52) U.S. Cl.
CPC .......... *G06K 9/18* (2013.01); *G06K 9/00718* (2013.01); *G06K 9/00751* (2013.01);
(Continued)

(58) Field of Classification Search
CPC ........ G06N 3/08; G06N 3/0445; G06N 3/084; G06K 9/00718; G06K 9/00751;
(Continued)

(56) References Cited

U.S. PATENT DOCUMENTS

2013/0278631 A1* 10/2013 Border ................. G02B 27/017
345/633
2017/0174261 A1* 6/2017 Micks .................... B60W 30/00
(Continued)

OTHER PUBLICATIONS

Santos et al., Classifying Relations by Ranking with Convolutional Neural Networks, May 24, 2015, Proceedings of the 52th Annual Meeting of the Association for Computational Linguistics, pp. 655-665. (Year: 2015).*

(Continued)

*Primary Examiner* — Shane D Woolwine
(74) *Attorney, Agent, or Firm* — Joseph Kolodka (57) ABSTRACT

Systems and methods for training a recursive neural network (RNN) is provided. The method includes generating, by the processor using the RNN, a plurality of embedding vectors based on a plurality of observations, wherein the observations include (i) a subject, (ii) an action taken by the subject, and (iii) an object on which the subject is taking the action on, wherein the subject and object are constant. The method further includes generating, by the processor, predictions of one or more future events based on one or more comparisons of at least some of the plurality of embedding vectors. The method also includes initiating, by the processor, based on the predictions, an action to a hardware device to mitigate expected harm to at least one item selected from the group consisting of the hardware device, another hardware device related to the hardware device, and a person related to the hardware device.

20 Claims, 8 Drawing Sheets

(51) Int. Cl.
 *G06K 9/00* (2006.01)
 *H04N 7/18* (2006.01)
 *G06K 9/62* (2006.01)
 *G06N 3/08* (2006.01)

(52) U.S. Cl.
 CPC ....... *G06K 9/00771* (2013.01); *G06K 9/6274* (2013.01); *G06K 9/6292* (2013.01); *G06N 3/0445* (2013.01); *G06N 3/082* (2013.01); *G06N 3/084* (2013.01); *H04N 7/181* (2013.01); *H04N 7/188* (2013.01); *G06K 2009/00738* (2013.01); *G06K 2209/01* (2013.01); *G06K 2209/19* (2013.01)

(58) Field of Classification Search
 CPC .... G06K 9/00771; G06K 9/18; G06K 9/6274; G06K 9/6292; G06K 2009/00738; G06K 2209/01; G06K 2209/19; H04N 7/181; H04N 7/188
 USPC .......................................................... 706/21
 See application file for complete search history.

(56) References Cited

U.S. PATENT DOCUMENTS

2017/0227673 A1* 8/2017 Venugopalan ....... G01N 21/314
2017/0364766 A1* 12/2017 Das ................... G06K 9/00664

OTHER PUBLICATIONS

Granroth_Wilding, M. et al., "What Happens Next? Event Prediction Using a Compositional Neural Network Model" AAAI'16 Proceedings of the Thirtieth AAAI Conference on Artificial Intelligence (Feb. 2016) pp. 2727-2733.

Bordes, A. et al., "Joint Learning of Words and Meaning Representations for Open-Text Semantic Parsing" Proceedings of the Fifteenth International Conference on Artificial Intelligence and Statistics (Apr. 2012) pp. 127-135.

Chambers, N. et al., "Unsupervised Learning of Narrative Event Chains" Proceedings of ACL-08 (Jun. 2008) pp. 789-797.

Chklovski, T. et al., "VERBOCEAN: Mining the Web for Fine-Grained Semantic Verb Relations" EMNLP (2004) pp. 33-40.

Mikolov, T. et al., "Efficient Estimation of Word Representations in Vector Space" arXiv (Jan. 2013) pp. 1-12.

Modi, A. et al., "Inducing Neural Models of Script Knowledge" CoNLL (Jun. 2014) pp. 49-57, vol. 14.

Rudinger, R. et al., "Script Induction as Language Modeling" EMNLP (Sep. 2015) pp. 1681-1686.

Bowman, S.R. et al., "A large annotated corpus for learning natural language inference" arXiv (Aug. 2015) pp. 1-11.

Pichotta, K. et al., "Statistical Script Learning with Multi-Argument Events" EACL (Apr. 2014) pp. 220-229.

* cited by examiner

RECURSIVE NEURAL NETWORKS ON FUTURE EVENT PREDICTION

RELATED APPLICATION INFORMATION

This application claims priority to Provisional Application 62/300,968 filed on Feb. 29, 2016, incorporated herein by reference in its entirety. Further, this application is related to concurrently filed application titled "VIDEO CAMERA DEVICE AND SYSTEM USING RECURSIVE NEURAL NETWORKS FOR FUTURE EVENT PREDICTION", and application Ser. No. 15/420,518.

BACKGROUND

Technical Field

The present invention relates to Recursive Neural Networks (RNN), and more particularly training RNNs in predicting future events.

Description of the Related Art

Much of the current future prediction work with RNNs focuses on detecting entailment or paraphrase relationships between two sentences or events. Work on detecting temporal relationships is needed. Some models are designed solely for predicting textual order of events instead of semantic order of events. As a consequence, some models do not model the fact that some specific events will not occur in the future as a consequence of the occurrence of a previous event. As an example, once an apple is fully consumed, it is unlikely that the next future event will be to "eat the apple." Current models do not attempt to remove the specific events that will not occur in the future, because of the occurrence of a previous event, from the set of possible future events.

While current efforts focus on detecting entailment or paraphrase relationships between two sentences or events, there is little work on detecting temporal relationships. One line of research, tries to extract "what happens-after an event occurs" relationships from large collections of text using bootstrapping methods utilizing resources such as VerbOcean. In the context of script learning, another line of work, uses corporate statistics such as event bi-grams to define probabilities of what the next possible event will be.

However, such models cannot generalize situations of new events that have not been observed before. These models are designed for predicting textual order of events instead of semantic order of events. What is needed is an ability to train a recursive neural network (RNN) in predicting the occurrence of future events. Further, what is needed is a method for the RNN to learn how to make accurate predictions of future events and for the RNN to take action automatically in hazardous situations in order to mitigate risk to human life and damage to property.

SUMMARY

According to an aspect of the present invention, a computer-implemented method for training a recursive neural network (RNN) is provided. The method includes generating, by the processor using the RNN, a plurality of embedding vectors based on a plurality of observations, wherein the observations include (i) a subject, (ii) an action taken by the subject, and (iii) an object on which the subject is taking the action on, wherein the subject and object are constant. The method further includes generating, by the processor, predictions of one or more future events based on one or more comparisons of at least some of the plurality of embedding vectors. The method also includes initiating, by the processor, based on the predictions, an action to a hardware device to mitigate expected harm to at least one item selected from the group consisting of the hardware device, another hardware device related to the hardware device, and a person related to the hardware device.

According to another aspect of the present invention, a system for training a recursive neural network (RNN) is provided. The system includes a processor, wherein the processor is configured to carry out the steps of generating, using the RNN, a plurality of embedding vectors based on a plurality of observations, wherein the observations include (i) a subject, (ii) an action taken by the subject, and (iii) an object on which the subject is taking the action on, wherein the subject and object are constant. The system further includes generating predictions of one or more future events based on one or more comparisons of at least some of the plurality of embedding vectors. The system also includes initiating based on the predictions, an action to a hardware device to mitigate expected harm to at least one item selected from the group consisting of the hardware device, another hardware device related to the hardware device, and a person related to the hardware device.

According to yet another aspect of the present invention a non-transitory computer-readable storage medium comprising a computer-readable program for training a recursive neural network (RNN) is provided. The computer-readable program when executed on a computer causes the computer to perform the steps of generating, using the RNN, a plurality of embedding vectors based on a plurality of observations, wherein the observations include (i) a subject, (ii) an action taken by the subject, and (iii) an object on which the subject is taking the action on, wherein the subject and object are constant. The computer further performs the steps of generating predictions of one or more future events based on one or more comparisons of at least some of the plurality of embedding vectors. The computer also performs the steps of initiating based on the predictions, an action to a hardware device to mitigate expected harm to at least one item selected from the group consisting of the hardware device, another hardware device related to the hardware device, and a person related to the hardware device.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present invention, systems and methods are provided for training RNNs to predict future events and in hazardous situations, to automatically take action in order to mitigate harm to human life or to prevent significant damage to property.

Figure 1:
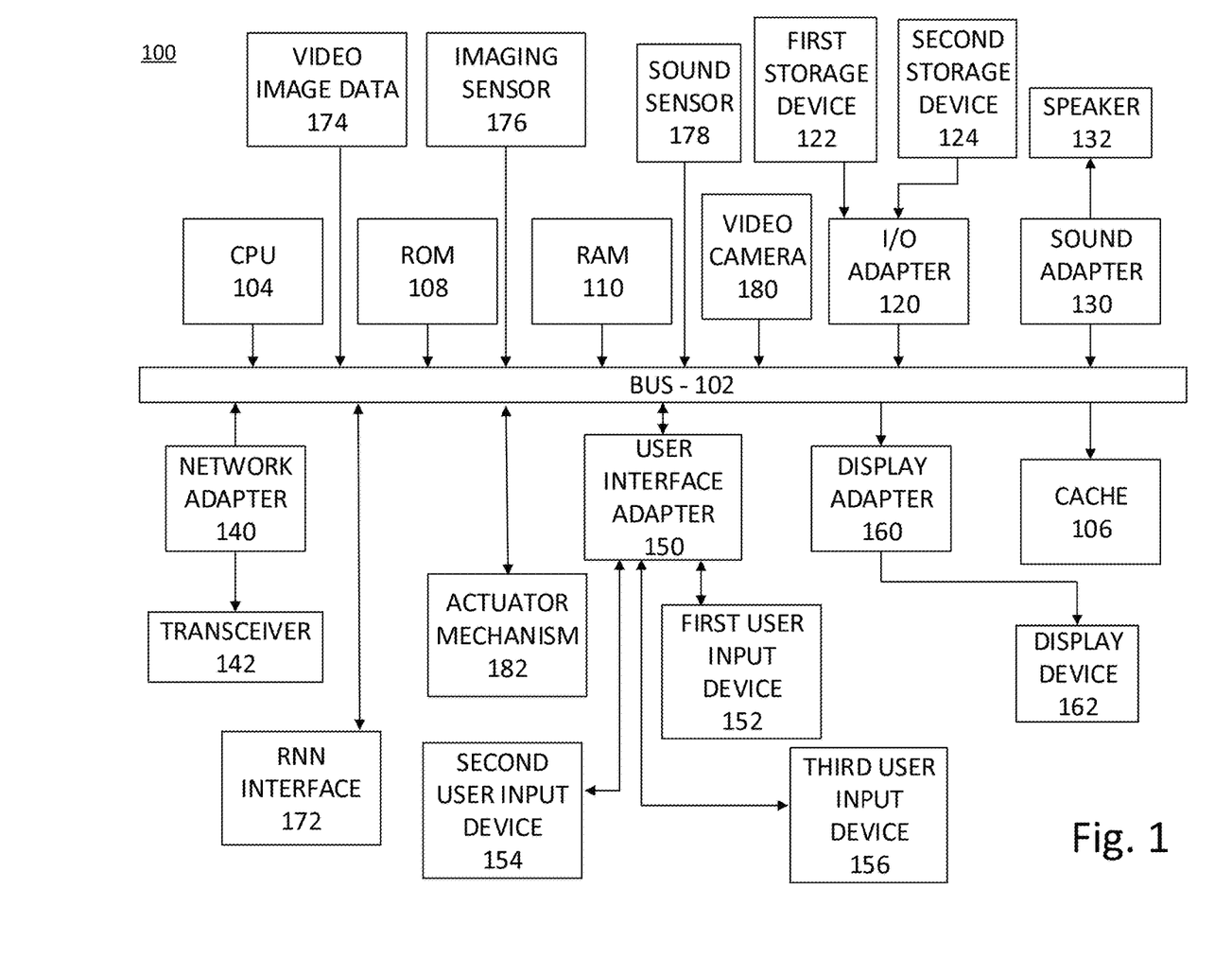
FIG. 1 is a functional diagram illustrating a system for distinguishing future events, in accordance with an embodiment of the present invention.

Referring now in detail to the figures in which like numerals represent the same or similar elements and initially to FIG. 1, a processing system 100 for RNN future prediction and event mitigation is illustratively depicted in accordance with an embodiment of the present invention. The processing system 100 includes at least one processor ("CPU") 104 operatively coupled to other components via a system bus 102. A cache 106, a Read Only Memory ("ROM") 108, a Random Access Memory ("RAM") 110, an input/output ("I/O") adapter 120, a sound adapter 130, a network adapter 140, a user interface adapter 150, and a display adapter 160, are operatively coupled to the system bus 102.

A storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices. In some embodiments, the RNN can be stored in storage accessible by the system 100, such as storage devices 122, 124 or a network attached storage.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used. The user input devices 152, 154, and 156 can be the same type of user input device or different types of user input devices. The user input devices 152, 154, and 156 are used to input and output information to and from system 100.

The RNN interface 172 can also alternatively engage with the system for training the RNN, screening video image data 174 for automatic image recognition, and can also actuate mitigating action through an actuator mechanism 182 in order to protect human life or prevent destruction of property based on the prediction of future events by the RNN. The imaging sensor 176 can capture image data available for the RNN through the RNN Interface 172. The sound sensor 178 can sense sound available for the RNN through the RNN Interface 172. The video camera 180 can capture data available for the RNN through the RNN Interface 172.

Of course, the processing system 100 may also include other elements (not shown), as readily contemplated by one skilled in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
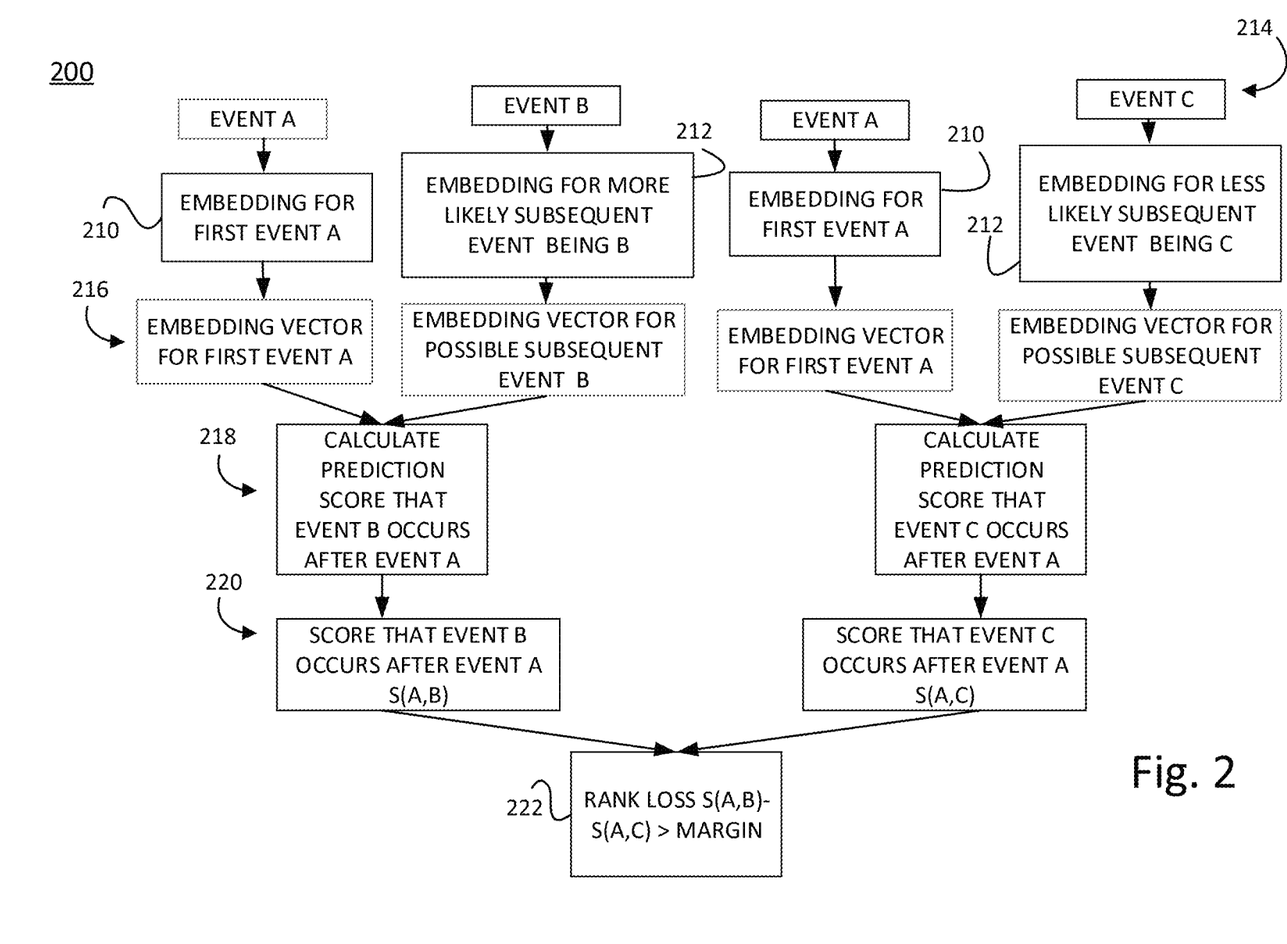
FIG. 2 is a high level block/flow diagram of a system for training a deep learning recursive neural network (RNN), in accordance with an embodiment of the present invention.
Figure 3:
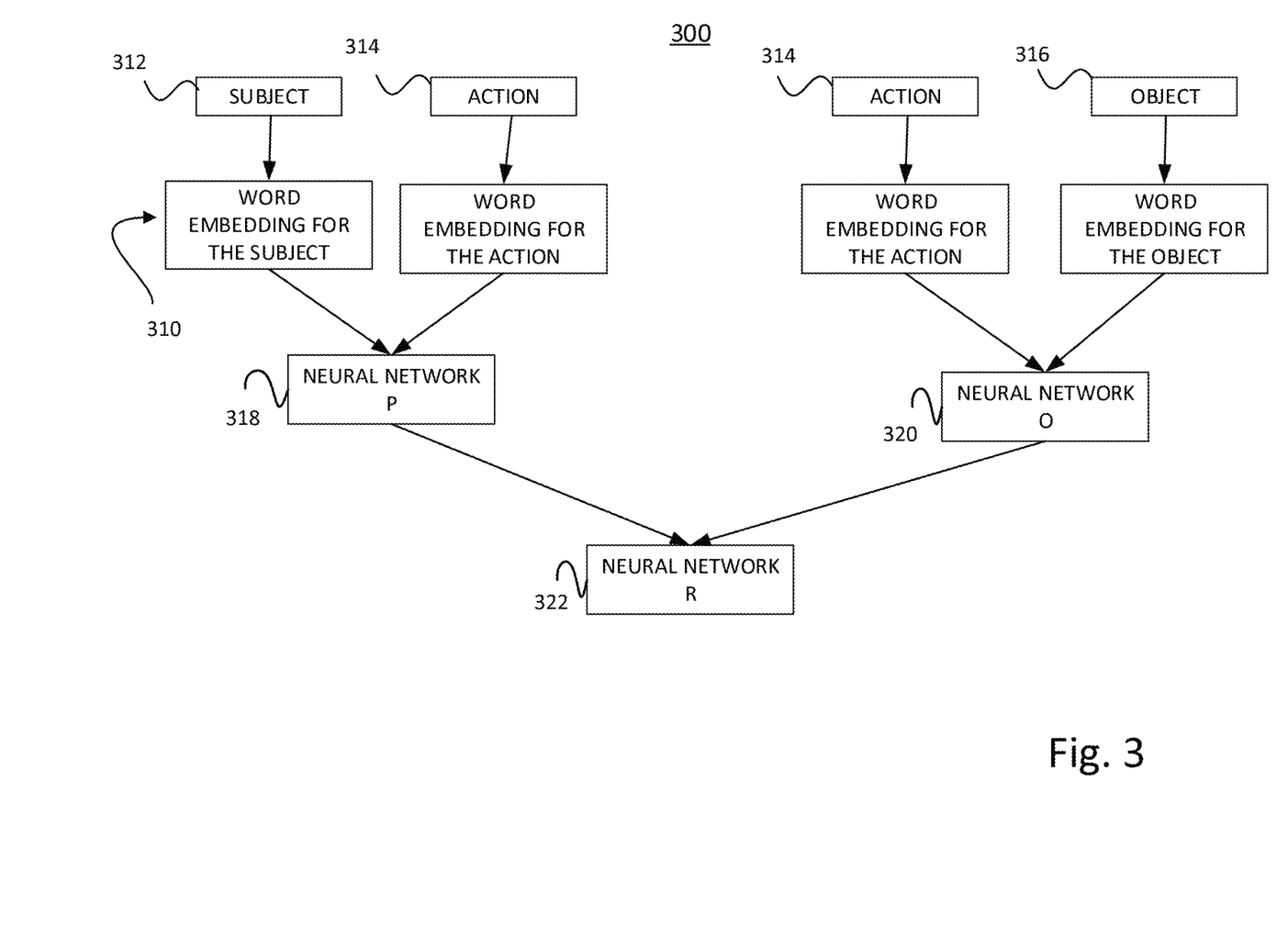
FIG. 3 is a high level block/flow diagram illustrating the method of word embeddings of the deep learning recursive neural network (RNN), in accordance with an embodiment of the present invention.
Figure 5:
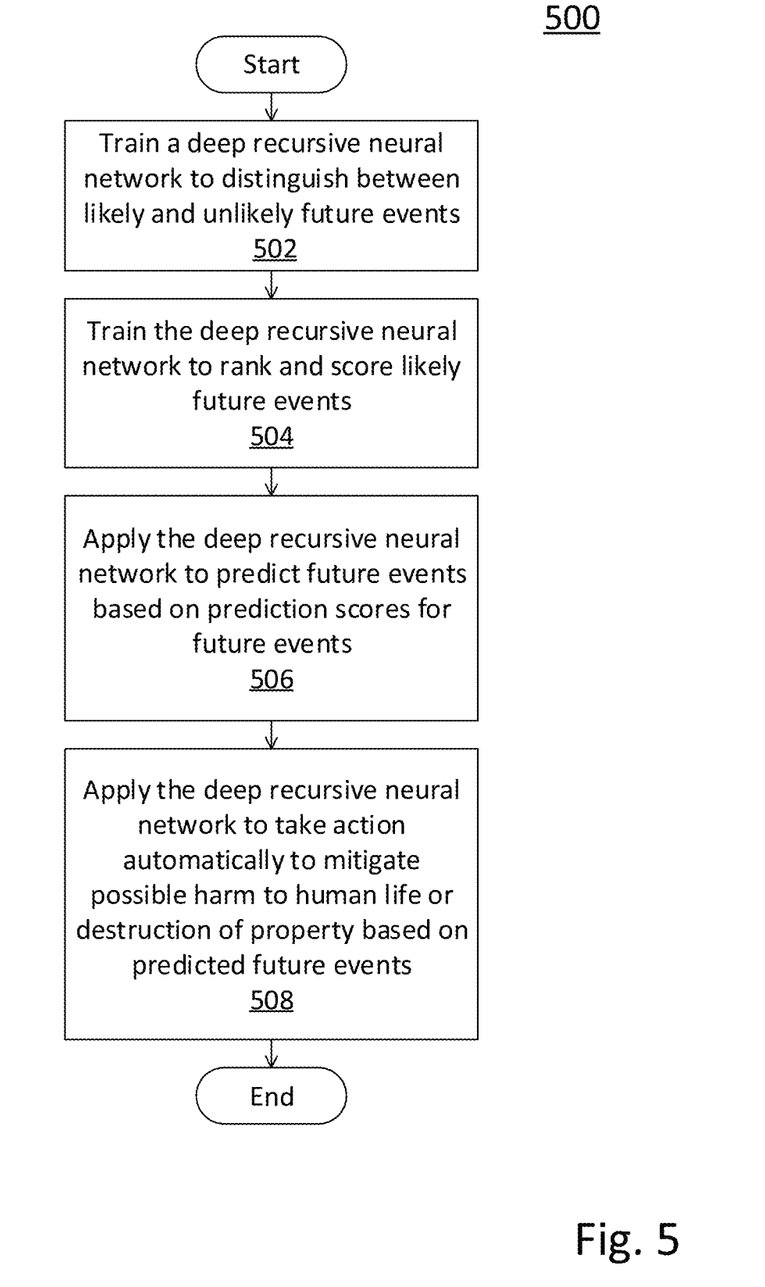
FIG. 5 is a flow diagram illustrating a method for distinguishing future events, predicting future events in a hazardous situation, and actuating mitigating action in accordance with an embodiment of the present invention.
Figure 6:
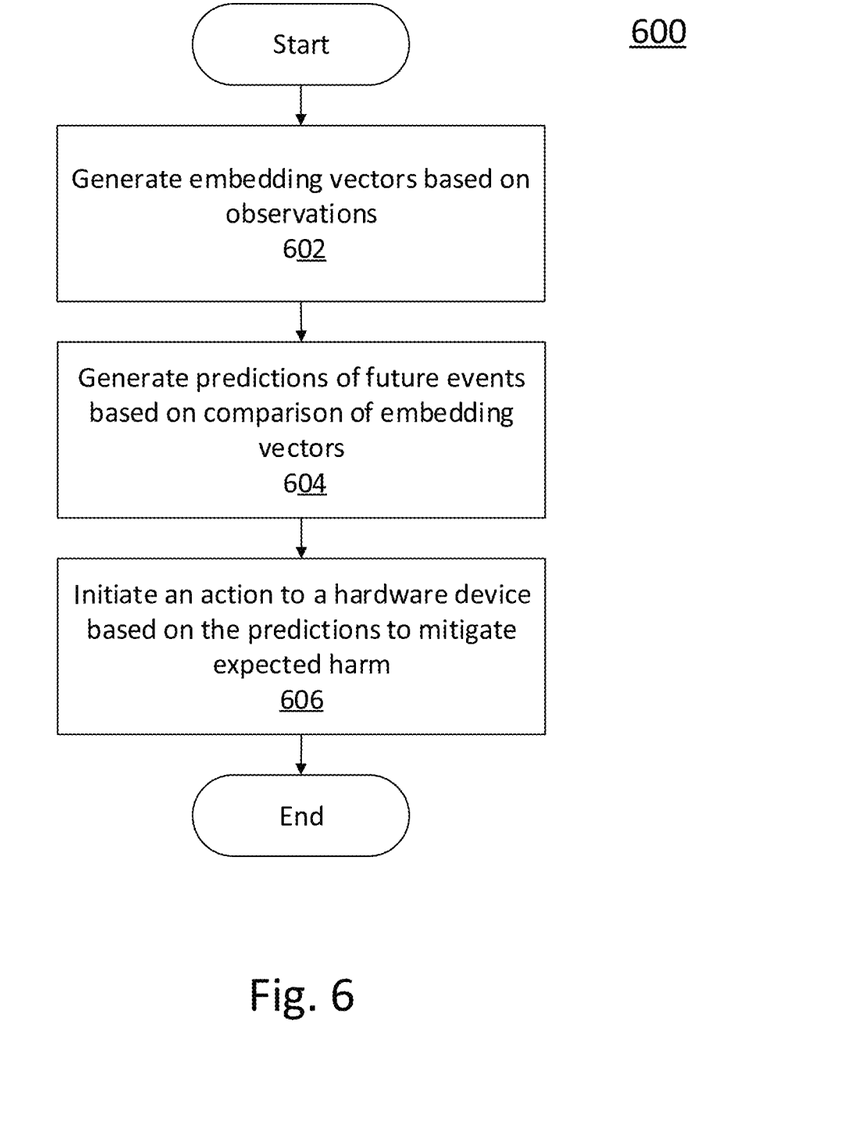
FIG. 6 is a flow diagram illustrating a method for predicting one or more future events, and initiating an action to mitigate expected harm in accordance with an embodiment of the present invention.
Figure 8:
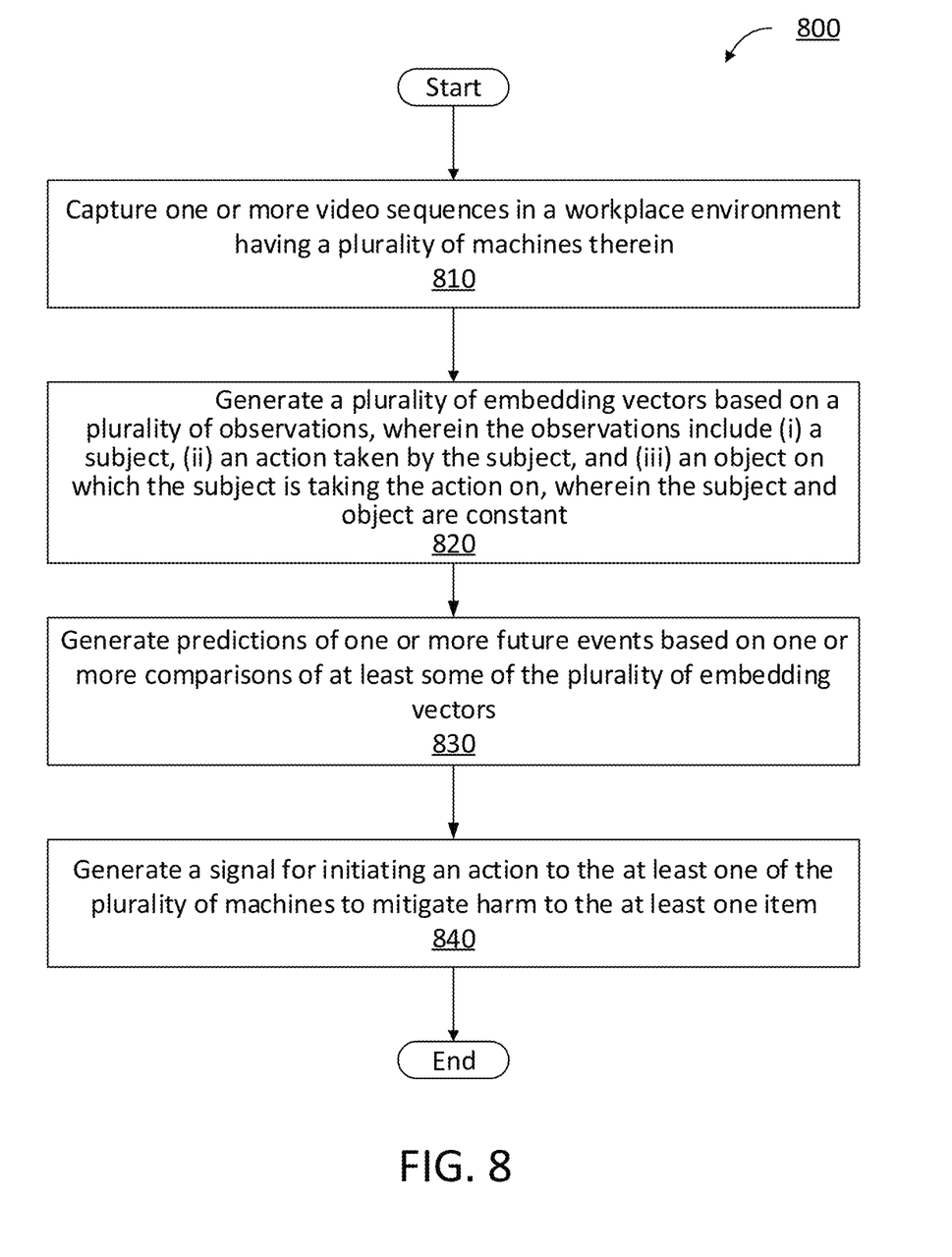
FIG. 8 shows a flow diagram of another exemplary method 800 for using a recursive neural network (RNN), in accordance with an embodiment of the present invention.

It is to be appreciated that processing system 100 may perform at least part of the method described herein including, for example, at least part of method 200 of FIG. 2, method 300 of FIG. 3, method 500 of FIG. 5, method 600 of FIG. 6, and method 800 of FIG. 8.

Figure 7:
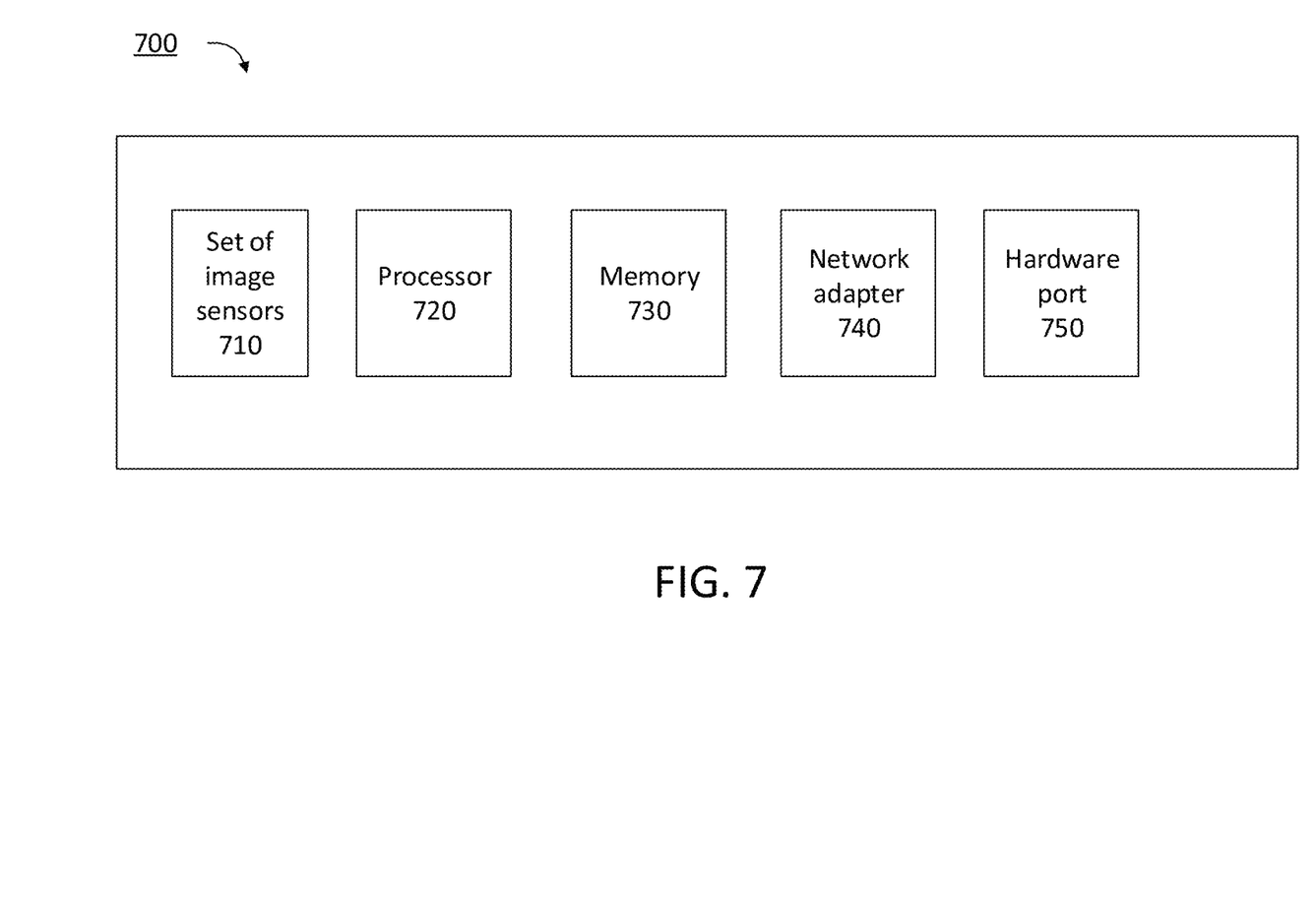
FIG. 7 shows a block diagram of an exemplary video camera 700, in accordance with an embodiment of the present invention.

Also, it is to be appreciated that system 700 described below with respect to FIG. 7 is a system for implementing respective embodiments of the present invention. Part or all of processing system 100 may be implemented in one or more of the elements of system 700.

Referring now to FIG. 2, a high-level system/method 200 for future event prediction is illustratively depicted in accordance with an embodiment of the present invention. That is, FIG. 2 depicts the overall structure of training an RNN for future event prediction 200. The "embedding of first event" 210 and "embedding of (potential) subsequent event" 212 converts the events 214 into respective "embedding vectors" 216. A prediction score 220 is calculated 218. The prediction score 220 represents a probability that event Y will occur if event X occurs first. The rank loss 222 calculates whether the prediction score 220, given an initial event (A), of the right prediction (B) is higher than the wrong prediction (C), and training of the RNN is performed by minimizing the rank margin loss.

Referring now to FIG. 3, a system/method for event embedding networks 300 is illustratively depicted in accordance with an embodiment of the present invention. Event embedding structure 300 is provided to illustrate the word embeddings and event embeddings 310. The components of the event prediction, the components including a "subject" 312, "action" 314, and "object" 316, are converted into word embeddings 310. Subsequently, the "subject" 312 and "action" 314 are sent to a neural network P 318 for word embedding. Additionally, the "action" 314 and "object" 316 are sent to another neural network O 320 to get word embedding. Subsequently, then the subject and the action embedding and the action and object embedding are in turn sent to yet another neural network R 322 to produce the final event embedding.

Figure 4:
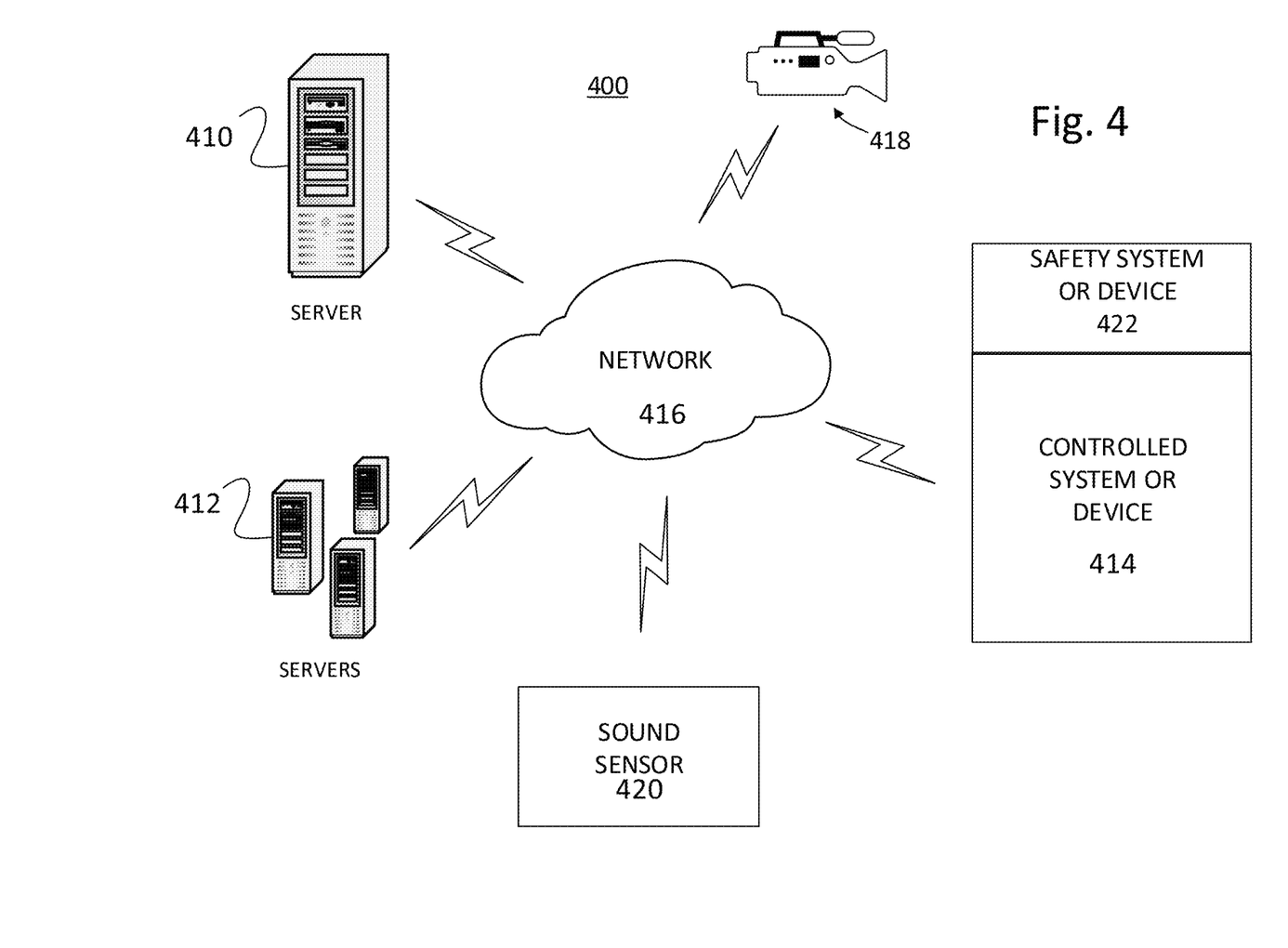
FIG. 4 is a schematic illustrating recursive neural network (RNN) communications, in accordance with an embodiment of the present invention.

FIG. 4 shows a block diagram of an exemplary environment 400 to which the present invention can be applied, in accordance with an embodiment of the present invention. The environment 400 is representative of a computer network to which the present invention can be applied. The elements shown relative to FIG. 4 are set forth for the sake of illustration. However, it is to be appreciated that the present invention can be applied to other network configurations and other operational environments as readily contemplated by one of ordinary skill in the art given the teachings of the present invention provided herein, while maintaining the spirit of the present invention.

The environment 400 at least includes at least one safety system or device 422, at least one video camera 418, a computer processing system 410 (labeled "server" in FIG. 4), a plurality of servers 412, at least one sound sensor 420, at least one controlled system(s), machine(s), and/or device(s) (individually and collectively denoted by the reference numeral 414 and hereinafter referred to as "controlled system, machine, and/or device"). For the sake of simplicity and illustration, the preceding elements are shown in singular form, but can be readily extended to more than one of any of the preceding elements as readily appreciated by one of ordinary skill in the art given the teachings of the present invention provided herein, while maintaining the spirit of the present invention. The computer processing system 410 can be any type of computer processing system including, but not limited to, servers, desktops, laptops, tablets, smart phones, media playback devices, and so forth, depending upon the particular implementation. For the sake of illustration, the computer processing system computer processing system is a server.

The at least one video camera 418 is configured to capture one or more video sequences that are processed by the computer processing system 410.

The computer processing system 410 is configured to perform large-margin high-order deep learning with auxiliary tasks for video-based anomaly detection. Moreover, the computer processing system 410 is configured to perform an action (e.g., a control action) on the controlled system, machine, and/or device 414 responsive to detecting an abnormality. Such action can include, but is not limited to, one or more of: powering down the controlled system, machine, and/or device 422 or a portion thereof; powering down, e.g., a system, machine, and/or a device that is affected by another device, opening a valve to relieve excessive pressure, locking an automatic fire door, and so forth. As is evident to one of ordinary skill in the art, the action taken is dependent upon the type of abnormality and the controlled system, machine, and/or device 414 to which the action is applied.

The safety system or device 422 can implement the aforementioned or other action. The safety system or device 422 can be a shut off switch, a fire suppression system, an overpressure valve, and so forth. As is readily appreciated by one of ordinary skill in the art, the particular safety system or device 422 used depends upon the particular implementation to which the present invention is applied. Hence, the safety system 422 can be located within or proximate to or remote from the controlled system, machine, and/or device 422, depending upon the particular implementation.

In the embodiment shown in FIG. 4, the elements thereof are interconnected by a network(s) 416. In particular, the network 416 is depicted as a wireless network. However, in other embodiments, other types of connections (e.g., wired, etc.) can also be used. Additionally, one or more elements in FIG. 4 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of environment 400 are readily determined by one of ordinary skill in the art, given the teachings of the present invention provided herein, while maintaining the spirit of the present invention.

Referring now to FIG. 5, is a block/flow diagram of a method 500 for training a Recursive Neural Network (RNN) for future prediction and event mitigation is illustratively depicted in accordance with an embodiment of the present invention. In block 502, the RNN is trained to distinguish between likely and unlikely future events. In block 504, the RNN is trained to rank and score likely future events. In block 506, the RNN is applied to predict future events in a dangerous environment. In block 508, the RNN is applied to automatically take action to mitigate possible harm to human life or significant damage to property.

Referring now to FIG. 6, is a block/flow diagram of a method 600 for training a Recursive Neural Network (RNN) for future prediction and event mitigation is illustratively depicted in accordance with an embodiment of the present invention. In block 602 embedding vectors are generated based on observations. In block 604 predictions of future events using the RNN are generated based on comparison of embedding vectors. In block 606 an action to a hardware device is initiated based on the predictions to mitigate expected harm.

FIG. 7 shows a block diagram of an exemplary video camera 700, in accordance with an embodiment of the present invention. The video camera 700 includes a set of image sensors 710, a processor 720, a memory 730, a network adapter 740, and a hardware port 750. The image sensors 710 capture video sequences processed by the processor 720 and the memory 730. The processor 720 and memory 730 can initiate an action to mitigate expected harm to the at least one item using a RNN as described herein. The network adapter 740 sends a signal that causes the action to occur. Exemplary actions are described herein that can be taken. The hardware port 750 receives a wired communication medium over which the signal can be transmitted.

FIG. 8 shows a flow diagram of another exemplary method 800 for using the recursive neural network (RNN), in accordance with an embodiment of the present invention. The RNN can be formed from any of method 200 of FIG. 2, method 300 of FIG. 3, method 500 of FIG. 5, method 600 of FIG. 600, and method 800 of FIG. 8. The method 800 can be readily applied to workplace scenarios such as factories, assembly lines, manufacturing plants, distribution plants, and so forth. In an embodiment, method 800 is performed by a video camera adapted to perform video-based detection (such as video camera 700).

At step 810, capture one or more video sequences in a workplace environment having a set of machines therein. At step 820, generate a plurality of embedding vectors based on a plurality of observations, wherein the observations include (i) a subject, (ii) an action taken by the subject, and (iii) an object on which the subject is taking the action on, wherein the subject and object are constant. At step 830 generate predictions of one or more future events based on one or more comparisons of at least some of the plurality of embedding vectors. At step 840, generate a signal for initiating an action to the at least one of the plurality of machines to mitigate harm to the at least one item.

A Stanford dependency parser was run with a co-reference resolution on the English Wikipedia. Subsequently, for each article a list of events of the form (subject, action, object) sorted in the order of occurrence. All words are lemmatized, and for subject and object WH-pronouns are not considered. Next, are extracted positive examples with the same subject and the same object: $(S, V_1, O) \Rightarrow_t (S, V_2^{pos},$ O), if (S, $V_1$, O) occurs before (S, $V_2^{pos}$, O) in an article. $V_1>_t V_2^{pos}$ is listed in VerbOcean as happens-after and therefore ($V_1 => V_2$) according to WordNet.

For each positive relation, negative relations of the form are selected (S, $V_1$, O)$=>_t$(S, $V_2^{neg}$, O), by randomly selecting without replacement a $V_2^{neg}$ such that $V_2^{neg}$ is different from $V_1$ and $V_1=>_t V_2^{neg}$ is not listed in VerbOcean as happens-after.

The event (S, $V_2^{neg}$, O) occurs at least once in the corpus. This requirement helps to respect the selectional preference of $V_2^{neg}$.

Future prediction data set is denoted by F. Examples of the created data are shown in Table 1 (upper-half). Due to the limited coverage of VerbOcean, several negative examples appear equally likely than the positive examples.

Table 1 shows examples of future prediction data. (S, $V_1$, O)$=>_t$ (S, $V_2^{pos}$, O) and other possible future events (S, $V_2^{neg}$, O) that are considered to be less likely than (S, $V_2^{pos}$, O) are shown.

TABLE 1

Future Data Set F

| | |
|---|---|
| $V_1$ observation | (Bohner, schedule, vote) |
| $V_2^{pos}$ future event | (Bohner, reschedule, vote) |
| $V_2^{neg}$ less likely future events | (Bohner, allow, vote) |
| | (Bohner, promise, vote) |
| | (Bohner, receive, vote) |
| $V_1$ observation | (state, accept, law) |
| $V^{pos}$ future event | (state, violate, law) |
| $V_2^{neg}$ less likely future events | (state, hold, law) |
| | (state, impose, law) |
| | (state, nullify, law) |
| | (state, enact, law) |

Future Data Set $F_S$

| | |
|---|---|
| $V_1$ observation | (Air, suspend, operation) |
| $V_2^{pos}$ future event | (Air, restart, operation) |
| $V_2^{neg}$ less likely future events | (Air, initiate, operation) |
| | (Air, announce, operation) |
| | (Air, commence, operation) |
| $V_1$ observation | (Church, purchase, property) |
| $V^{pos}$ future event | (Church, sell, property) |
| $V_2^{neg}$ less likely future events | (Church, rent, property) |

Additionally, another data set Fs is shown where the negative relations are selected by additionally adding the requirement:

$V_2^{neg}=>_t V_1$ according to VerbOcean, or $V_1=>V_2^{neg}$.

The resulting data set contains positive examples, where each positive example has on average 4 corresponding negative examples. Examples of the created data can be seen in Table 1 (lower half). The statistics of both data sets are shown in Table 2.

TABLE 2

| | F | $F_S$ |
|---|---|---|
| grounded positive rules | 4371 | 7402 |
| ungrounded positive rules | 1539 | 1031 |
| ungrounded negative rules | 5851 | 2879 |

In an embodiment, a function provides a linear combination of the word embeddings of words in e1 and e2 and then passes it to two non-linear functions.

$l(e_1,e_2)$ is the (unnormalized) likelihood for the rule $e_1=>_t e_2$.

The FCN model only performs a linear combination of the word embeddings of words in $e_1$ and e2, and subsequently the combination is operated on by two non-linear functions.

Let $x_{p1} \in R^d$ and $x_{p2} \in R^d$ be the word embeddings of the action of the first and second event respectively. Furthermore, let $x_s$ and $x_o$, be the word embeddings of the subject and object, respectively. We define:

$$y = M_s x_s + M_{p1} x_{p1} + M_{p2} x_{p2} + M_o x_o \quad (1)$$

and then
$$l(e_1,e_2) = s^T g_2(A(g_1(y))) \quad (2)$$

where $g_1$ and $g_2$ are the component-wise non-linearity functions which both are set to rectifier, and $A \in R^{d \times d}$ and $s \in R^d$.

Training is performed minimizing the rank margin loss:

$$Lp(a,b) = \max\{0, x - l(e_1, e_2^{pos}) + l(e_1, e_2^{neg})\} \quad (3)$$

Where $e_1=>_t e_2^{pos}$ and $e_1$ NOT$=>_t e_2^{neg}$ are positive negative samples from the training corpus, and t is some threshold value, for example 1. $e_2^{pos}$ are events that satisfy $e_1=>_t e_2$ while $e_2^{neg}$ are events that do not. All parameters of the model are trained using stochastic gradient descent and drop-out procedures before each non-linear function.

In an embodiment of the present invention, a Seman Matching Energy Function (SMEF) is provided. The SMEF utilizes the event scheme previously used to embed each event, and uses margin rank loss as in Equation 3.

Limiting the variable data within the observations results in a reduction in the time lag in generating predictions. Limiting the variable data further reduces computational costs involved in generating predictions. Further still, limiting the variable data results in generated predictions with higher accuracy.

In an embodiment, the RNN is deployed in police hostage negotiation situations, wherein the RNN is trained to predict the likelihood of future events given the immediate actions of a suspect or perpetrator. The RNN learns to predict the occurrence of future events, and is automatically configured to take immediate action if harm to human life or significant damage to property is imminent. Automatic actions taken can include automatically securing magnetic door locks in a facility, alerting police officers of the predicted event, and providing annunciation of the predicted event at remote locations.

In another embodiment, the RNN is deployed as an automatic police safety protection system. The police safety protection system is operated by the RNN and receives image data from the police officer's body armor camera and police vehicle camera. The RNN is trained to predict future events based on a suspect's actions. The RNN is configured to automatically mitigate a health or safety risk to the police officers, when the RNN predicts a future event that would bring harm to the police officers. Automatic actions can include deploying additional body armor devices for the police officers, alerting police officers of the predicted event, and providing annunciation of the predicted event at remote locations.

In another embodiment, the RNN is deployed within an industrial facility and is trained to monitor hazardous conditions. In particular, in power generation facilities utilizing fossil fuel boilers, the RNN is deployed to monitor the boiler room personnel and to take immediate action, based on observed personnel actions, to prevent harm to human life or significant property damage. Automatic actions can include shutting down a boiler or furnace, automatic shutdown of equipment or preventing human access to hazardous areas.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for training a recursive neural network (RNN), the method comprising:
generating, by a processor using the RNN, a plurality of embedding vectors based on a plurality of observations, wherein the observations include (i) a subject, (ii) an action taken by the subject, and (iii) an object on which the subject is taking the action on, wherein the subject and object are constant;
generating, by the processor, based on a prediction score, predictions of one or more future events based on one or more comparisons of at least some of the plurality of embedding vectors, the RNN being trained to distinguish between likely and unlikely future events and to rank and score future events determined to be the likely events, wherein the prediction score represents a probability that an event Y will occur if an event X occurs first, a rank loss is calculated based on a determined accuracy of the predictions, and margin loss is minimized during training of the RNN; and
initiating, by the processor, based on the predictions, an action to a hardware device to mitigate expected harm to at least one item selected from the group consisting of the hardware device, another hardware device related to the hardware device, and a person related to the hardware device.

2. The method of claim 1, wherein the predictions of one or more future events include a next subsequent event.

3. The method as recited in claim 1, wherein the observations further comprise one or more video images, and wherein the RNN utilizes image recognition to interpret any of the observations that include the one or more video images.

4. The method as recited in claim 1, wherein the embedding vectors include vectors selected from the group consisting of positive embedding vectors and negative embedding vectors.

5. The method as recited in claim 1, wherein the predictions of one or more future events are calculated based on a positive embedding vector and a negative embedding vector.

6. The method as recited in claim 1, wherein the observations include at least one previously unobserved observation.

7. The method as recited in claim 1, wherein the observations include audio, wherein the RNN utilizes voice recognition to interpret the observations that include the audio.

8. The method as recited in claim 1, wherein the initiating an action includes the RNN initiating the action utilizing an actuator mechanism.

9. The method as recited in claim 1, wherein the initiating an action is automatically performed by the RNN.

10. The method as recited in claim 1, wherein the observations further include a subset from a plurality of more than one action.

11. A system for training a recursive neural network (RNN), the system comprising:
a processor, configured to:
generate, using the RNN, a plurality of embedding vectors based on a plurality of observations, wherein the observations include (i) a subject, (ii) an action taken by the subject, and (iii) an object on which the subject is taking the action on, wherein the subject and object are constant;
generate based on a prediction score, predictions of one or more future events based on one or more comparisons of at least some of the plurality of embedding vectors, the RNN being trained to distinguish between likely and unlikely future events and to rank and score future events determined to be the likely events, wherein the prediction score represents a probability that an event Y will occur if an event X occurs first, a rank loss is calculated based on a determined accuracy of the predictions, and margin loss is minimized during training of the RNN; and initiate based on the predictions, an action to a hardware device to mitigate expected harm to at least one item selected from the group consisting of the hardware device, another hardware device related to the hardware device, and a person related to the hardware device.

12. The system as recited in claim 11, wherein the observations further comprise one or more video images, and wherein the RNN utilizes image recognition to interpret any of the observations that include the one or more video images.

13. The system as recited in claim 11, wherein the embedding vectors include vectors selected from the group consisting of positive embedding vectors and negative embedding vectors.

14. The system as recited in claim 11, wherein the observations include audio, wherein the RNN utilizes voice recognition to interpret the observations that include the audio.

15. The system as recited in claim 11, wherein the predictions of one or more future events are calculated based on a positive embedding vector and a negative embedding vector.

16. The system as recited in claim 11, wherein the observations include at least one previously unobserved observation.

17. A non-transitory computer-readable storage medium comprising a computer-readable program for training a recursive neural network (RNN), wherein the computer-readable program when executed on a computer causes the computer to perform the steps of:

generating, by a processor using the RNN, a plurality of embedding vectors based on a plurality of observations, wherein the observations include (i) a subject, (ii) an action taken by the subject, and (iii) an object on which the subject is taking the action on, wherein the subject and object are constant;

generating, by the processor, based on a prediction score, predictions of one or more future events based on one or more comparisons of at least some of the plurality of embedding vectors, the RNN being trained to distinguish between likely and unlikely future events and to rank and score future events determined to be the likely events, wherein the prediction score represents a probability that an event Y will occur if an event X occurs first, a rank loss is calculated based on a determined accuracy of the predictions, and margin loss is minimized during training of the RNN; and initiating, by the processor, based on the predictions, an action to a hardware device to mitigate expected harm to at least one item selected from the group consisting of the hardware device, another hardware device related to the hardware device, and a person related to the hardware device.

18. The non-transitory computer-readable storage medium of claim 17, wherein the predictions of one or more future events include a next subsequent event.

19. The non-transitory computer-readable storage medium of claim 17, wherein the observations further comprise one or more video images, and wherein the RNN utilizes image recognition to interpret any of the observations that include the one or more video images.

20. The non-transitory computer-readable storage medium of claim 17, wherein the observations include audio, wherein the RNN utilizes voice recognition to interpret the observations that include the audio.

* * * * *